G. C. GREENLEAF.
Milk-Receptacles.

No. 153,944 — Patented Aug. 11, 1874.

Witnesses
Stoughton N. Dickinson
Joseph W. Brown

Inventor
Geo. C. Greenleaf

UNITED STATES PATENT OFFICE.

GEORGE C. GREENLEAF, OF MOIRA, NEW YORK.

IMPROVEMENT IN MILK-RECEPTACLES.

Specification forming part of Letters Patent No. 153,944, dated August 11, 1874; application filed May 13, 1874.

*To all whom it may concern:*

Be it known that I, GEORGE C. GREENLEAF, of Moira, in the county of Franklin and State of New York, have invented a new and Improved Milk-Pan; and I do hereby declare that the following is a full, clear, and exact description of the same, reference being had to the accompanying drawing forming a part of this specification, in which—

Figure 1:
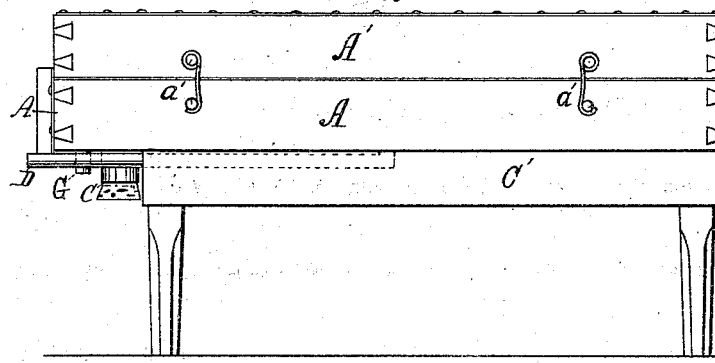
Figure 2:
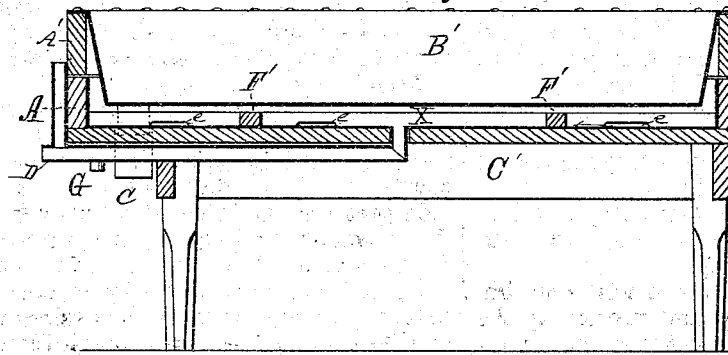
Figure 3:
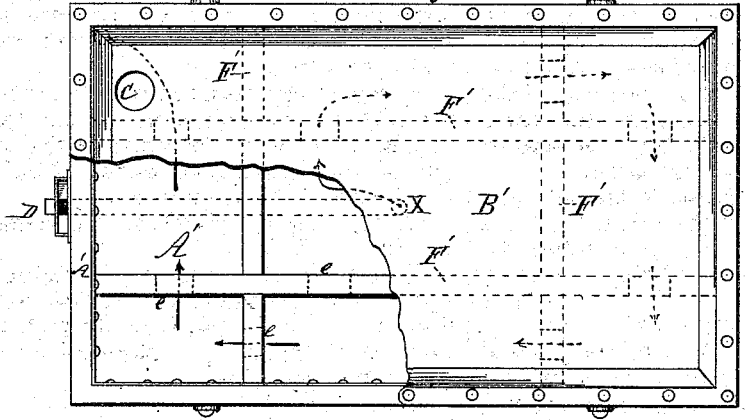
Figure 4:
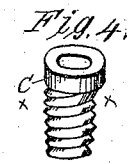

Figure 1 is a side elevation; Fig. 2, a longitudinal section; Fig. 3, a plan view with corner of pan broken away.

This invention relates to a new and improved means of cooling and preserving the sweetness of milk; and consists in the combination of a milk-pan fastened to a frame with a second frame or tray divided into compartments by partitions. Said pan rests upon these partitions, and into the central compartment formed thereby is introduced cold water, which, after cooling the central portions of the milk, circulates, through holes in the partitions, around the edges of the pan, and is finally discharged through an outlet.

In the drawing, B' represents the milk-pan permanently attached to the frame A'. A is the supplemental frame or tray, to which the pan B' and frame A' are detachably connected by the hooks and pins a'. C' represents a frame and set of legs, which fit beneath and support the apparatus. D is the supply-pipe for furnishing the apparatus with water, terminating in the central compartment X, and delivering its water into the same. F' represents the partitions dividing the tray into compartments, and having the communicating holes e. C is a vent in the milk-pan, through which the milk is drawn off, and is usually stopped by a plug. G represents a short stand-pipe in the tray A', which rises a short distance above the bottom, and acts as a discharge for the warm water.

When the pan is filled with milk it is evident that the central portions will be the warmest, from the fact that they have not the same chances to radiate their heat as do the side portions. Cold water is, therefore, introduced through the pipe D and delivered into the compartment X just below the center of the pan. The milk is by this means rapidly reduced in temperature to the desired degree, and the water passes out through the holes e, circulating in its passage around the edges of the pan, and is finally discharged through the stand-pipe G, the warmest portions passing first, from the fact that they rise and first reach the vent.

By regulating the rapidity of the circulation the milk may be maintained at any temperature between the temperature of the cold water and the normal temperature of the atmosphere, and always kept sweet.

Having thus described my invention, what I claim as new is—

The combination of the pan B' and its frame A' with the partitioned tray A, the central induction-pipe D X, the eduction-pipe G, and the milk-discharge C, substantially as and for the purpose specified.

Moira, May 11, 1874.

GEO. C. GREENLEAF.

Witnesses:
STOUGHTON N. DICKINSON,
JOSEPH W. BROWN.